United States Patent
Mitani et al.

(10) Patent No.: US 9,343,915 B2
(45) Date of Patent: May 17, 2016

(54) SEMICONDUCTOR DEVICE INCLUDING CHARGING SYSTEM

(71) Applicant: Seiko Instruments Inc., Chiba-shi, Chiba (JP)

(72) Inventors: Makoto Mitani, Chiba (JP); Kotaro Watanabe, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 524 days.

(21) Appl. No.: 13/784,184

(22) Filed: Mar. 4, 2013

(65) Prior Publication Data

US 2013/0249473 A1  Sep. 26, 2013

(30) Foreign Application Priority Data

Mar. 23, 2012  (JP) ................. 2012-068028
Dec. 6, 2012  (JP) ................. 2012-267344

(51) Int. Cl.
*H02J 7/00* (2006.01)

(52) U.S. Cl.
CPC ....... *H02J 7/0031* (2013.01); *H02J 2007/0037* (2013.01)

(58) Field of Classification Search
CPC .................................................. H02J 7/0031
USPC ........................................................ 320/107
See application file for complete search history.

(56) References Cited

U.S. PATENT DOCUMENTS

| 4,661,758 | A | * | 4/1987 | Whittaker ..................... 320/101 |
| 5,654,883 | A | * | 8/1997 | Takehara et al. ............... 363/79 |
| 5,682,305 | A | * | 10/1997 | Kurokami et al. ............. 363/79 |
| 5,714,869 | A | * | 2/1998 | Tamechika et al. ........... 320/101 |
| 6,051,954 | A | * | 4/2000 | Nagao et al. ................... 320/101 |
| 6,605,927 | B2 | * | 8/2003 | Bloch ....................... G11C 5/14 320/166 |
| 6,713,989 | B1 | * | 3/2004 | Reynolds ..................... 320/165 |
| 2001/0043050 | A1 | * | 11/2001 | Fisher, Jr. .................... 320/101 |
| 2008/0084117 | A1 | * | 4/2008 | Sander et al. ................... 307/46 |

FOREIGN PATENT DOCUMENTS

JP     10-336914 A    12/1998

* cited by examiner

*Primary Examiner* — Richard Isla Rodas
*Assistant Examiner* — Jerry D Robbins
(74) *Attorney, Agent, or Firm* — Brinks Gilson & Lione

(57) ABSTRACT

The semiconductor device includes the charging system including: electric power generating unit for supplying electric power; electric power storing unit for storing electric power generated by the electric power generating unit; switch unit provided in a charging path for charging the electric power storing unit with the electric power generated by the electric power generating unit; a comparator driven by the electric power generated by the electric power generating unit for comparing a reference voltage and a stored voltage of the electric power storing unit; and a level converter provided between the comparator and the switch unit for, based on a result of a comparison made by the comparator, converting a level of a generated voltage to a level of the stored voltage and outputting a resultant signal to the switch unit.

6 Claims, 9 Drawing Sheets

SEMICONDUCTOR DEVICE INCLUDING CHARGING SYSTEM

RELATED APPLICATIONS

This application claims priority under 35 U.S.C. §119 to Japanese Patent Application Nos. 2012-068028 filed on Mar. 23, 2012 and 2012-267344 filed on Dec. 6, 2012, the entire contents of which are hereby incorporated by reference.

BACKGROUND OF THE INVENTION

1. Field of the Invention

The present invention relates to a semiconductor device including a system for charging electric power storing means with electric power generated by electric power generating means, and more particularly, to an overcharge prevention circuit for preventing overcharge of the electric power storing means.

2. Description of the Related Art

FIG. 7 is a circuit diagram of a semiconductor device including a conventional charging system. The semiconductor device includes a solar battery 11 as electric power generating means, a secondary battery 12 as electric power storing means, a diode 13 as a backflow prevention circuit, a voltage detection circuit 14, and switch means 15. The voltage detection circuit 14 and the switch means 15 form an overcharge prevention circuit.

The backflow prevention diode 13 is connected in a charging path from the solar battery 11 to the secondary battery 12, and the switch means 15 is connected in parallel with the solar battery 11.

The voltage detection circuit 14 which is driven by the secondary battery 12 monitors the voltage of the secondary battery 12 and, when the voltage reaches an overcharge voltage, turns on the switch means to short out the solar battery, thus preventing overcharge. When the voltage detection circuit 14 does not detect overcharge, the secondary battery 12 is charged in accordance with the electric power generated by the solar battery 11. Operation of the backflow prevention diode 13 prevents backflow from the secondary battery 12 to the solar battery 11 (see, for example, Japanese Patent Application Laid-open No. Hei 10-336914).

However, the semiconductor device including the conventional charging system drives the voltage detection circuit 14 by the secondary battery 12, and thus, there is a problem that the power consumption of the secondary battery 12 is large. Although not illustrated in the figure, a load circuit which is driven by the secondary battery 12 is designed to operate with extremely low power consumption for the purpose of extending the life of the battery, and thus, it is a critical defect that extra electric power is consumed by the voltage detection circuit 14.

Further, the backflow prevention diode 13 is provided in the charging path, and thus, in charging, voltage loss is produced by the amount of a forward voltage of the backflow prevention diode to deteriorate the charging efficiency.

SUMMARY OF THE INVENTION

The present invention has been made in view of the above-mentioned problems, and provides a semiconductor device including a charging system in which a secondary battery does not consume electric power and which has high charging efficiency.

In order to solve the above-mentioned problems, according to an exemplary embodiment of the present invention, there is provided a semiconductor device including a charging system, including: electric power generating means for supplying electric power; electric power storing means for storing electric power generated by the electric power generating means; switch means provided in a charging path for charging the electric power storing means with the electric power generated by the electric power generating means; a comparator driven by the electric power generated by the electric power generating means for comparing a reference voltage and a stored voltage of the electric power storing means; and a level converter provided between the comparator and the switch means for, based on a result of a comparison made by the comparator, converting a level of a generated voltage of the electric power generating means to a level of the stored voltage and outputting a resultant signal to the switch means.

According to the present invention, the electric power storing means can be prevented from consuming electric power stored in the secondary battery, and thus, the power consumption of the secondary battery can be reduced and the charging efficiency can be improved.

DETAILED DESCRIPTION OF THE PREFERRED EMBODIMENTS

Embodiments of the present invention are described in the following with reference to the attached drawings. The description of the embodiments is made in the context that the higher potential side is a ground potential, electric power generating means 1 generates a negative voltage, and electric power storing means 2 stores a negative voltage. Specifically, the expression that the voltage is high or that the voltage is upper means that the absolute value of the voltage is small, while, the expression that the voltage is low or that the voltage is lower means that the absolute value of the voltage is large.

First Embodiment

Figure 1:
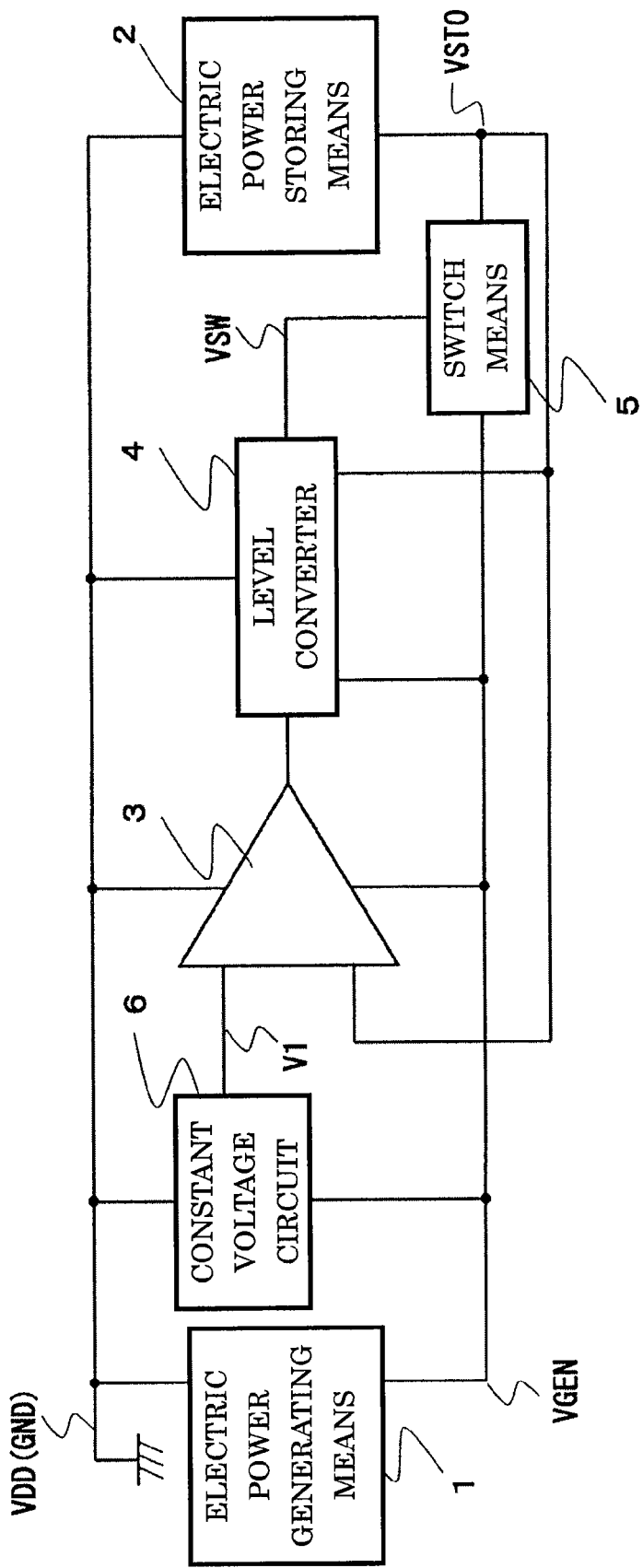
FIG. 1 is a block diagram of a semiconductor device including a charging system according to a first embodiment of the present invention.

FIG. 1 is a block diagram of a semiconductor device including a charging system according to a first embodiment of the present invention. The charging system of the first embodiment includes the electric power generating means 1, the electric power storing means 2, switch means 5 provided in a charging path, constant voltage circuit 6 which is driven by a generated voltage VGEN and which outputs a constant voltage V1, a comparator 3 which is driven by the generated voltage VGEN and which compares the constant voltage V1 and a stored voltage VSTO, and a level converter 4 which converts as necessary the output of the comparator 3 to the level of the stored voltage VSTO and which outputs a signal to a control terminal of the switch means 5.

Figure 6:
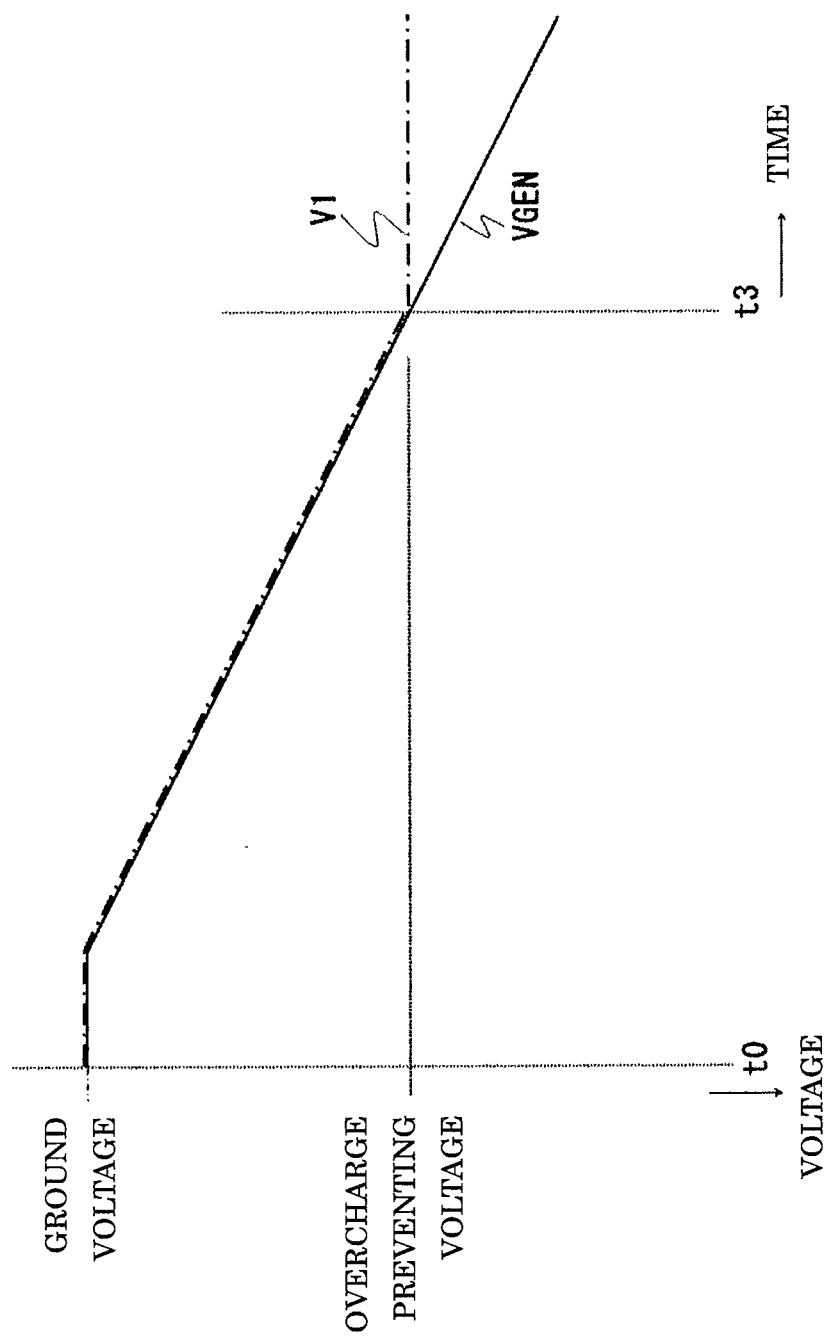
FIG. 6 is an explanatory diagram of operation of the constant voltage circuit of the overcharge prevention circuit according to the first embodiment.
Figure 7:
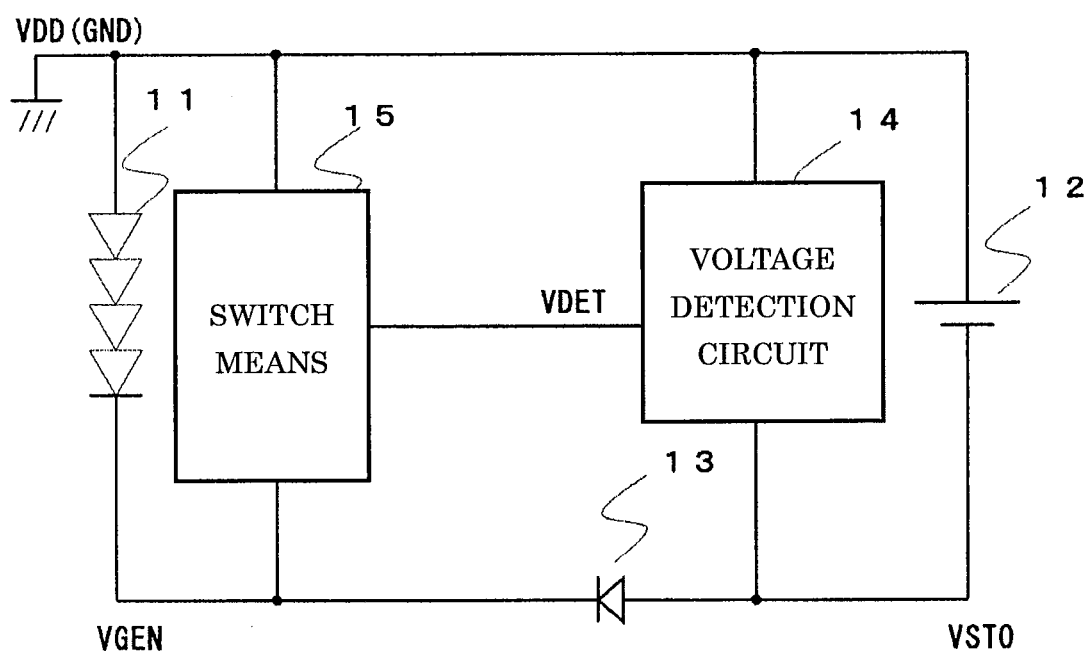
FIG. 7 is a block diagram of a semiconductor device including a conventional charging system.

Operation of the constant voltage circuit 6 is now described. FIG. 6 shows an output waveform of the constant voltage circuit 6. For some time after t0, the generated voltage VGEN outputs a negative voltage. During this time period, the constant voltage V1 outputs the same voltage as the generated voltage VGEN. At t3, the generated voltage VGEN reaches an overcharge preventing voltage VLIM. After that, even if the generated voltage VGEN outputs a more negative voltage, the constant voltage V1 is held at the level of the overcharge preventing voltage VLIM.

The comparator 3 outputs Low level when the constant voltage V1 is higher than the stored voltage VSTO, and outputs High level when the constant voltage V1 is lower than the stored voltage VSTO.

The level converter 4 converts as necessary the level of the generated voltage VGEN to the level of the stored voltage VSTO, and outputs Low level when the output of the comparator 3 is a drifting voltage.

The switch means 5 brings the charging path into conduction when a High level signal VSW is input to the control terminal thereof, and interrupts the charging path when a Low level signal VSW is input to the control terminal thereof.

Figure 3:
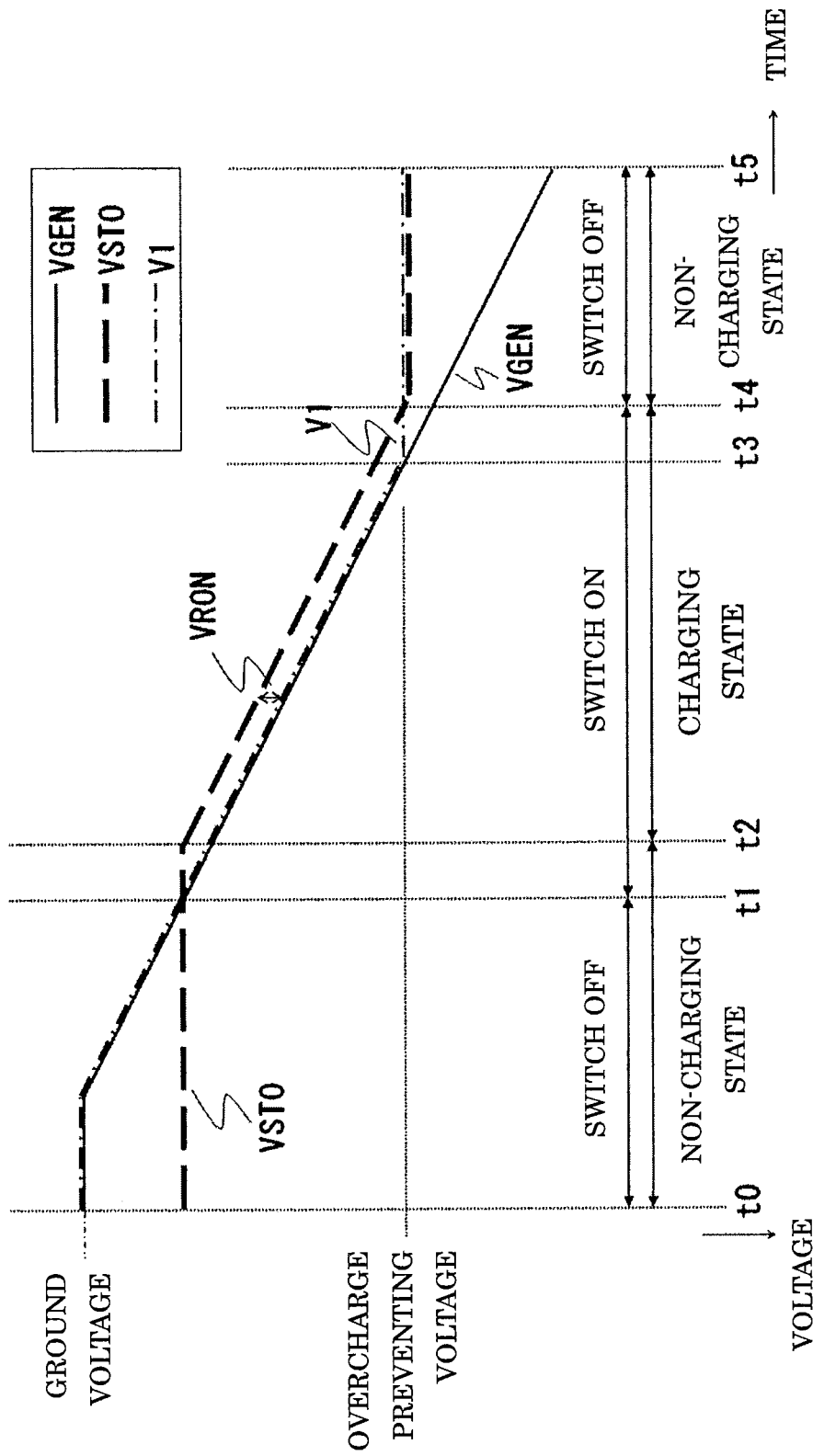
FIG. 3 is an explanatory diagram of operation of an overcharge prevention circuit of the semiconductor device including the charging system according to the first embodiment of the present invention.

FIG. 3 is an explanatory diagram of operation of an overcharge prevention circuit illustrated in FIG. 1. FIG. 3 illustrates a state in which the electric power generating means 1 generates a negative voltage and then the voltage becomes lower as time elapses from t0 to t5, During a time period from t0 to t1, the constant voltage V1 is higher than the stored voltage VSTO. As a result of a comparison made by the comparator 3, the Low level signal VSW is input to the control terminal of the switch means 5, resulting in a non-charging state (backflow preventing state) in which the charging path is interrupted.

During a time period from t1 to t2, the constant voltage V1 is lower than the stored voltage VSTO. As a result of a comparison made by the comparator 3, the High level signal VSW is input to the control terminal of the switch means 5, and the charging path is brought into conduction.

However, the absolute value of the difference between the stored voltage VSTO and the generated voltage VGEN (|VSTO−VGEN|) is smaller than a voltage VRON across the ON resistance of the switch means 5, and thus, the charging current does not flow and the state is the non-charging state.

During a time period from t2 to t3, the generated voltage VGEN is lower than the stored voltage VSTO, and the absolute value of the difference between the stored voltage VSTO and the generated voltage VGEN (|VSTO−VGEN|) is larger than the voltage VRON across the ON resistance of the switch means 5, and thus, the charging current flows. In other words, the state is a charging state in which the electric power storing means 2 is charged.

At time t3, the generated voltage VGEN reaches the overcharge preventing voltage VLIM, and after that, the constant voltage V1 is held at the level of the overcharge preventing voltage VLIM.

At time t4, the charged stored voltage VSTO reaches the constant voltage V1. As a result of a comparison made by the comparator 3, the Low level signal VSW is input to the control terminal of the switch means 5, and the state is the non-charging state (overcharge preventing state) in which the charging path is interrupted.

Figure 2:
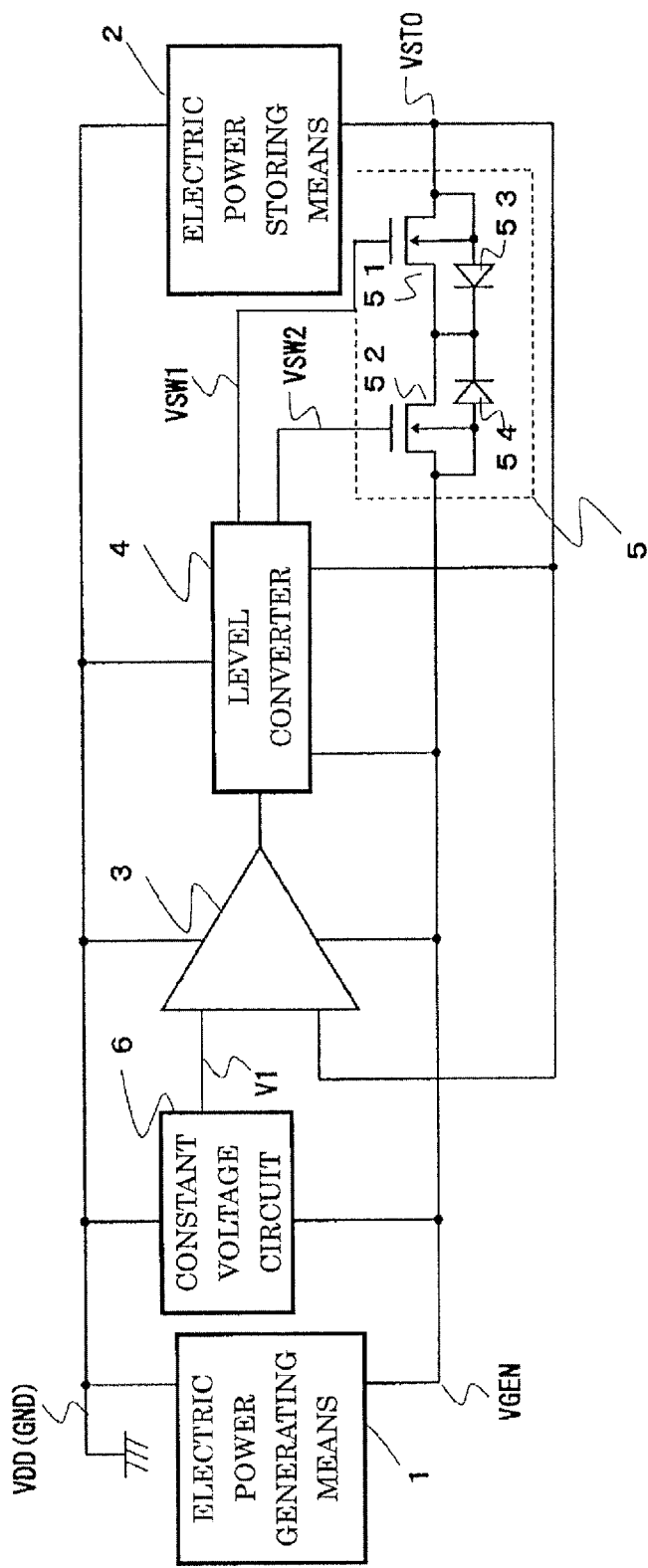
FIG. 2 is another block diagram of the semiconductor device including the charging system according to the first embodiment of the present invention.

FIG. 2 illustrates a specific example of the switch means 5. The switch means 5 and the level converter 4 are described in further detail with reference to FIG. 2.

The switch means 5 includes an NMOS transistor 51 and an NMOS transistor 52. A back gate terminal and one diffusion terminal of the NMOS transistor 51 are connected to the stored voltage VSTO. A back gate terminal and one diffusion terminal of the NMOS transistor 52 are connected to the generated voltage VGEN while the other diffusion terminal of the NMOS transistor 52 is connected to the other diffusion terminal of the NMOS transistor 51. By such connection, a parasitic diode 53 is formed including a cathode terminal which is the other diffusion terminal of the NMOS transistor 51 and an anode terminal which is the back gate terminal of the NMOS transistor 51. Similarly, a parasitic diode 54 is formed including a cathode terminal which is the other diffusion terminal of the NMOS transistor 52 and an anode terminal which is the back gate terminal of the NMOS transistor 52. The parasitic diodes 53 and 54 are connected in opposite directions between the electric power generating means 1 and the electric power storing means 2, and thus, the generated voltage VGEN and the stored voltage VSTO are not brought into conduction via the parasitic diodes 53 and 54. The voltage VRON across the ON resistance of the MOS transistors is smaller than the forward voltages of the diodes, and thus, the charging efficiency can be improved.

The level converter 4 outputs two kinds of signals: a signal VSW1 which is converted from an input signal at the level of the generated voltage VGEN to the level of the stored voltage VSTO; and a signal VSW2 which stays at the level of the generated voltage VGEN without level conversion. The signal VSW1 is input to a gate terminal of the NMOS transistor 51 while the signal VSW2 is input to a gate terminal of the NMOS transistor 52.

The switch means 5 and the level converter 4 which are configured as illustrated in FIG. 2 operate as follows.

During the time period from t0 to t1, the state is the backflow preventing state, and the signal VSW1 and the signal VSW2 are at the Low level. The Low level of the signal VSW1 is converted by the level converter 4 to the level of the stored voltage VSTO, while the Low level of the signal VSW2 stays at the generated voltage VGEN without level conversion. In this case, the lowest voltage is the stored voltage VSTO. Both the gate terminal and the diffusion terminal connected to the electric power storing means side of the NMOS transistor 51 are at the level of the stored voltage VSTO, and thus, the NMOS transistor 51 can be turned off without fail. The gate terminal of the NMOS transistor 52 is at the Low level, but is at the level of the generated voltage VGEN which is higher than the stored voltage VSTO. Thus, there is no guarantee that the NMOS transistor 52 is turned off without fail. However, the NMOS transistor 51 is turned off, and thus, the entire operation is performed without problems.

During a time period from t1 to t4, the switch means 5 is on, and the signal VSW1 and the signal VSW2 are at the High level. No matter whether or not the level is converted, a ground voltage VDD is output as the signal VSW1 and as the signal VSW2. The ground voltage VDD is the highest voltage, and thus, both the NMOS transistors 51 and 52 can be turned on without fail.

During a time period from t4 to t5, the state is the overcharge preventing state, and the signal VSW1 and the signal VSW2 are at the Low level. The Low level of the signal VSW1 is converted by the level converter 4 to the level of the stored voltage VSTO, while the Low level of the signal VSW2 is the generated voltage VGEN without level conversion. In this case, the lowest voltage is the generated voltage VGEN. Both the gate terminal and the diffusion terminal connected to the electric power generating means side of the NMOS transistor 52 are at the level of the generated voltage VGEN, and thus, the NMOS transistor 52 can be turned off without fail. The gate terminal of the NMOS transistor 51 is at the Low level, but is at the level of the stored voltage VSTO which is higher than the generated voltage VGEN. Thus, there is no guarantee that the NMOS transistor 51 is turned off without fail. However, the NMOS transistor 52 is turned off, and thus, the entire operation is performed without problems.

Finally, exemplary circuit configurations of the comparator 3, the level converter 4, and the constant voltage circuit 6 are described.

Figure 4:
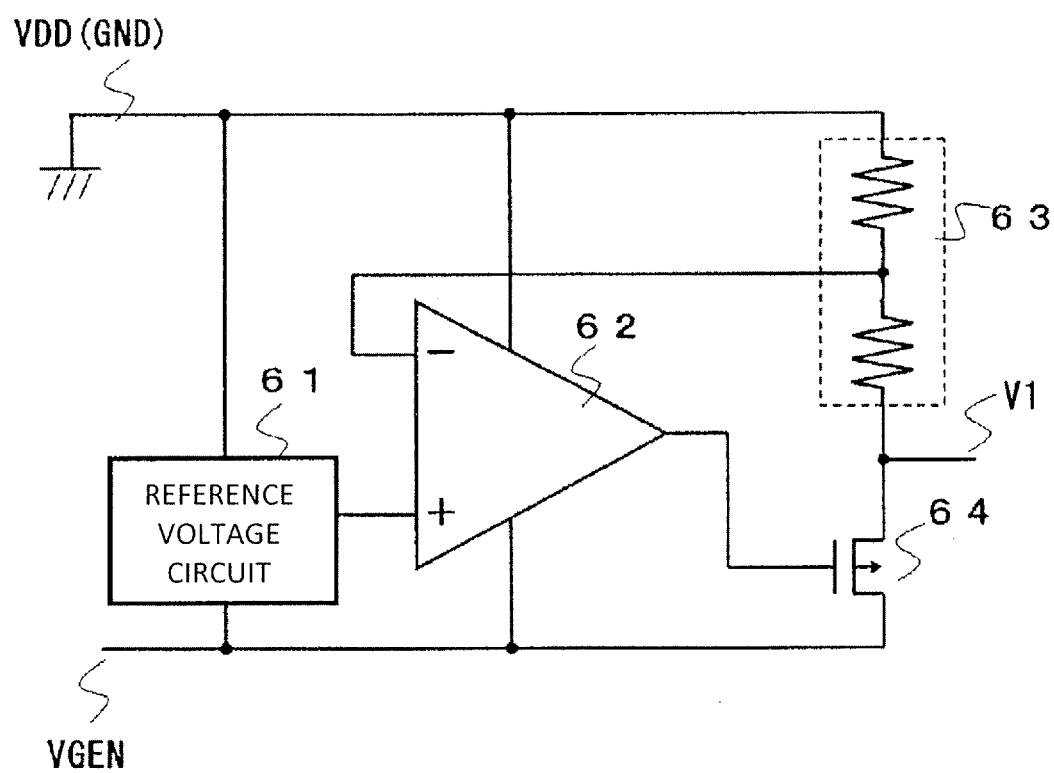
FIG. 4 is an exemplary constant voltage circuit of the overcharge prevention circuit according to the first embodiment.

FIG. 4 is an exemplary circuit configuration of the constant voltage circuit 6. The constant voltage circuit 6 includes, for example, a reference voltage circuit 61, an amplifier 62, a bleeder resistor 63, and an output driver 64. The ratio between the output voltage of the reference voltage circuit 61 and the bleeder resistor is adjusted so that the output voltage is the overcharge preventing voltage VLIM. In the constant voltage circuit 6 having such a configuration, when the generated voltage VGEN is lower than the overcharge preventing voltage VLIM which is the constant voltage output V1, V1=VLIM is satisfied, and when the generated voltage VGEN is higher than the overcharge preventing voltage VLIM, V1=VGEN is satisfied. In this way, desired operation can be realized.

Figure 5:
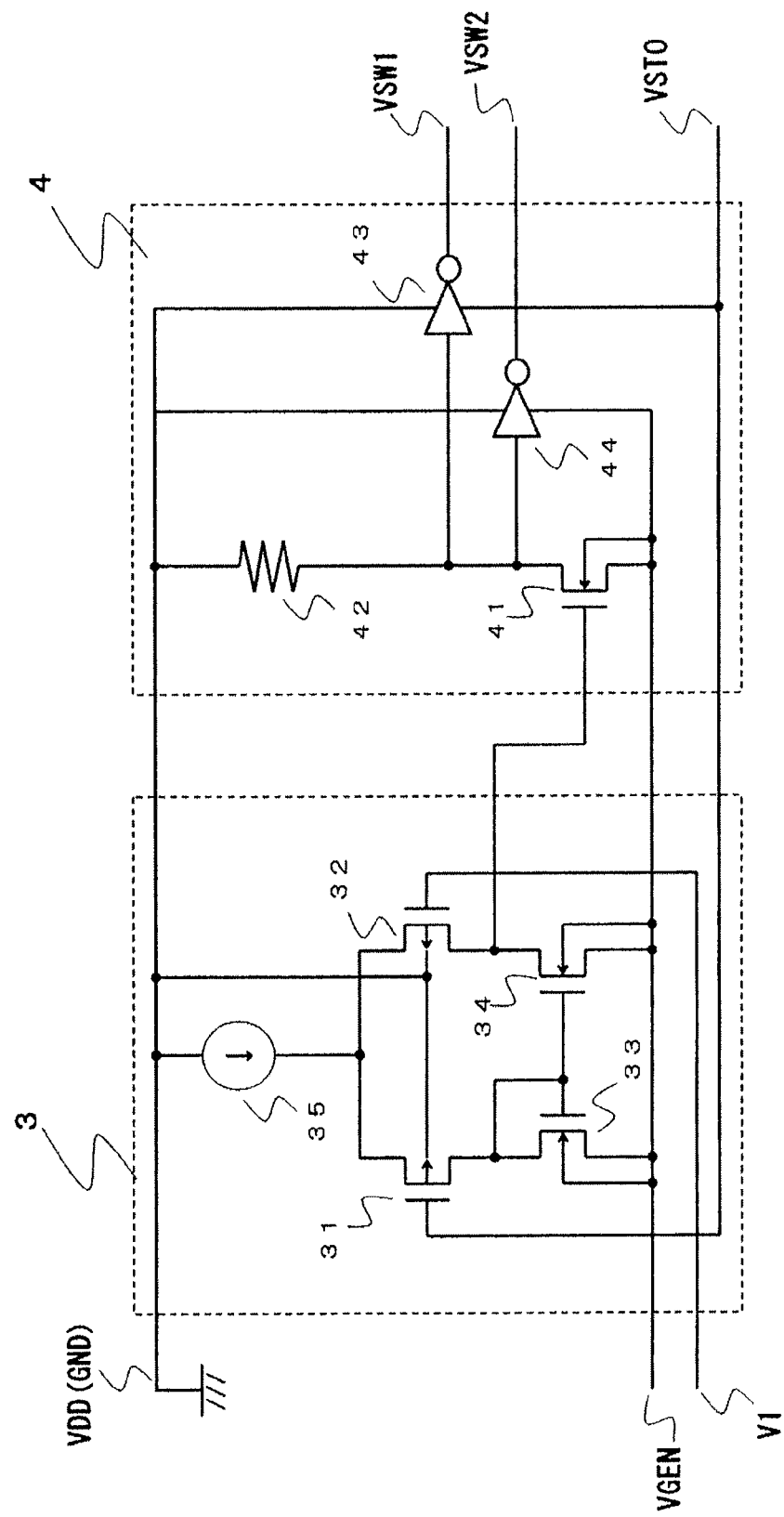
FIG. 5 illustrates an exemplary comparator and an exemplary level converter of the overcharge prevention circuit according to the first embodiment.

FIG. 5 illustrates an exemplary circuit configuration of the comparator 3 and the level converter 4. The comparator 3 includes, for example, PMOS transistors 31 and 32 as a differential pair, NMOS transistors 33 and 34 as a load circuit of the differential pair, and a current source 35 as a bias current source. The level converter 4 operates, for example, so that input from the comparator 3 is received by a common source stage including an NMOS transistor 41 and a resistor 42 and the output therefrom is wave-shaped by inverters 43 and 44. The inverter 43 is driven by the ground voltage VDD and the stored voltage VSTO, and outputs the signal VSW1 whose Low level is the stored voltage VSTO. The inverter 44 is driven by the ground voltage VDD and the generated voltage VGEN, and outputs the signal VSW2 whose Low level is the generated voltage VGEN.

The resistor 42 operates as initial voltage clamping means. The resistor 42 is not limited to a resistor, and a depression transistor may also be used.

As described above, according to the charging system of the first embodiment, there can be provided a semiconductor device including a charging system with high charging efficiency in which the electric power storing means does not consume electric power and which has the function of preventing overcharge.

Note that, the description of the embodiment has been made in the context that the higher potential side is the ground potential, the electric power generating means 1 generates a negative voltage, and the electric power storing means 2 stores a negative voltage. However, a case in which the lower potential side is the ground potential, the electric power generating means 1 generates a positive voltage, and the electric power storing means 2 stores a positive voltage is also within the scope of the present invention.

Second Embodiment

Figure 8:
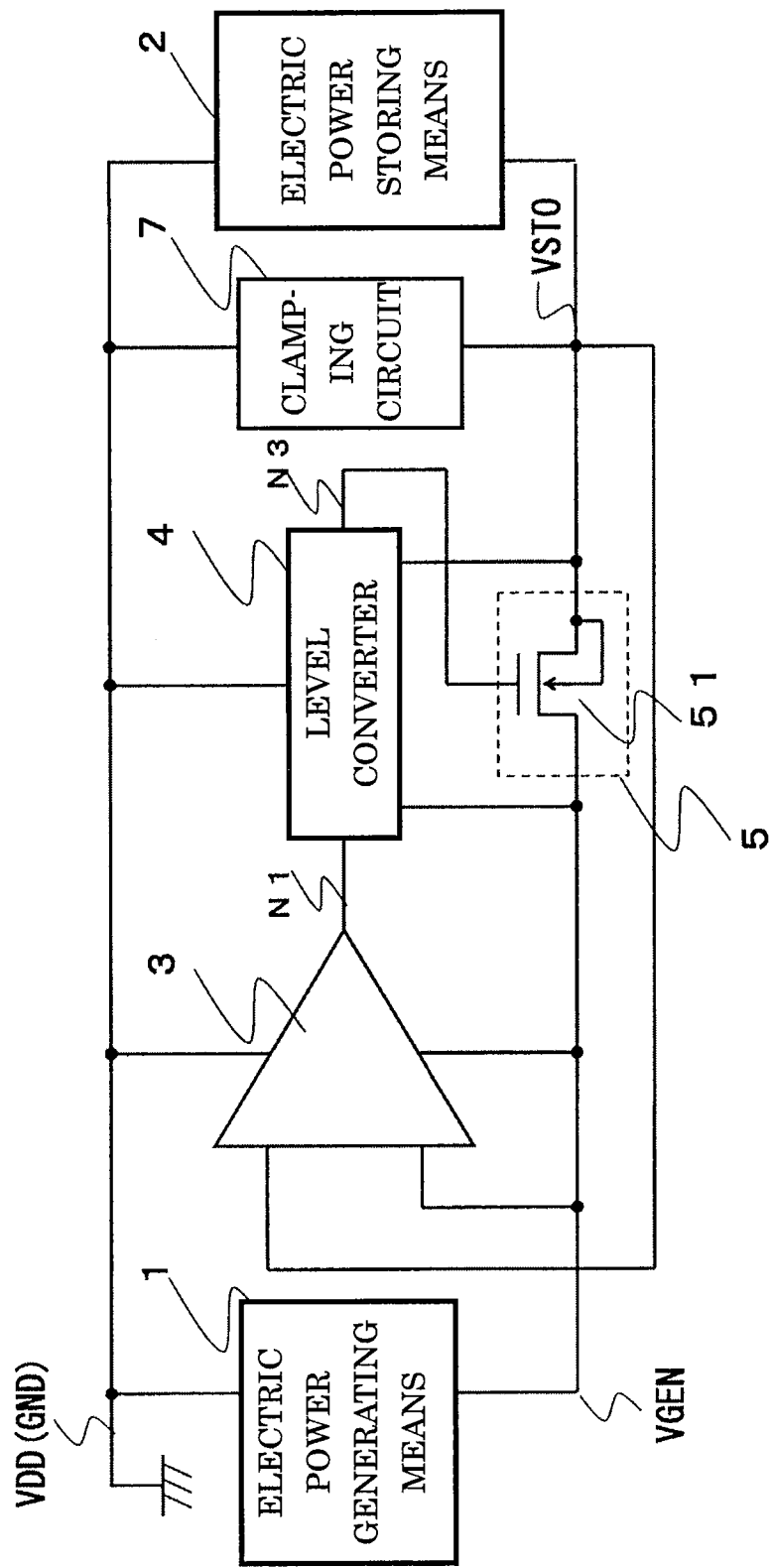
FIG. 8 is a block diagram of a semiconductor device including a charging system according to a second embodiment of the present invention.

FIG. 8 is a block diagram of a semiconductor device including a charging system according to a second embodiment of the present invention. The charging system of the second embodiment includes the electric power generating means 1, the electric power storing means 2, the comparator 3, the level converter 4, the switch means 5, and a clamping circuit 7.

The second embodiment is different from the first embodiment in that the clamping circuit 7 is configured to prevent overcharge, and thus, the generated voltage VGEN is directly input to the comparator 3. Specifically, the constant voltage circuit 6 is not required. Further, the switch means 5 can be configured only by the NMOS transistor 51.

Figure 9:
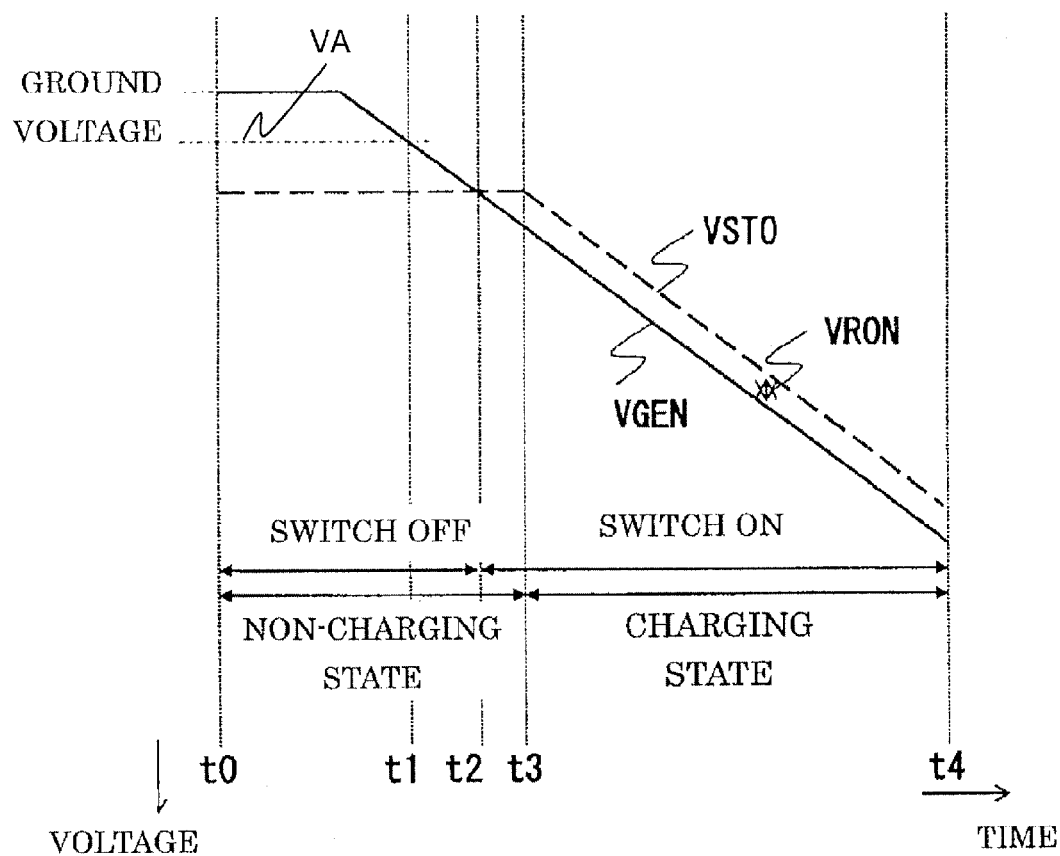
FIG. 9 is an explanatory diagram of operation of the semiconductor device including the charging system according to the second embodiment of the present invention.

FIG. 9 is an explanatory diagram of operation of the charging system of the second embodiment.

As time elapses from t0 to t4, the electric power generating means 1 generates a negative voltage and the voltage is lowered. A voltage VA is the lowest operating voltage of the comparator 3.

During a time period from t0 to t1, the generated voltage VGEN is higher than the voltage VA, and thus, the comparator 3 cannot operate and the output of the comparator 3 is a drifting voltage. In this case, the level converter 4 outputs a signal at the Low level and the NMOS transistor 51 is turned off.

During a time period from t1 to t2, the generated voltage VGEN is lower than the voltage VA, and thus, the comparator 3 starts to operate. In this case, the generated voltage VGEN is higher than the stored voltage VSTO, and thus, the level converter 4 outputs a signal at the Low level based on a comparison made by the comparator 3, and the NMOS transistor 51 is turned off.

Therefore, during the time period from t0 to t2, the NMOS transistor 51 is turned off, and thus, backflow current does not flow from the electric power storing means 2 to the electric power generating means 1.

During a time period from t2 to t3, the generated voltage VGEN is lower than the stored voltage VSTO, and thus, the NMOS transistor 51 is turned on based on a comparison made by the comparator 3. However, the absolute value of the difference between the stored voltage VSTO and the generated voltage VGEN (|VSTO−VGEN|) is smaller than a voltage VRON across the ON resistance of the NMOS transistor 51, and thus, the charging current does not flow and the state is the non-charging state.

During a time period from t3 to t4, the generated voltage VGEN is lower than the stored voltage VSTO, and the absolute value of the difference between the stored voltage VSTO and the generated voltage VGEN (|VSTO−VGEN|) is larger than the voltage VRON across the ON resistance of the NMOS transistor 51, and thus, the charging current flows. In other words, the state is the charging state in which the electric power storing means 2 is charged.

Here, operation of the level converter 4 is described. In FIG. 8, N1 is an output terminal of the comparator 3 and N3 is an output terminal of the level converter 4. During the time period from t0 to t2, in order to turn off the NMOS transistor 51, the level converter 4 is required to output Low level. Therefore, when an indefinite level is input to the level converter 4, the level converter 4 is required to output Low level. Further, the stored voltage VSTO is lower than the generated voltage VGEN, and thus, in order to turn off the NMOS transistor 51, the level converter 4 converts the output of the comparator 3 to the level of the stored voltage VSTO.

The comparator 3 is driven by the generated electric power, and thus, consumption of the stored electric power can be inhibited.

By the configuration described above, according to the charging system of the second embodiment, there can be provided a semiconductor device including a charging system in which the electric power storing means does not consume electric power and which has high charging efficiency.

What is claimed is:

1. A semiconductor device including a charging system, comprising:
   electric power generating means that supplies electric power;
   electric power storing means that stores electric power generated by the electric power generating means;
   a switch in a charging path for charging the electric power storing means with the electric power generated by the electric power generating device;
   a comparator driven by the electric power generated by the electric power generating means for comparing a reference voltage and a stored voltage of the electric power storing means; and
   a level converter between the comparator and the switch, the level converter including a first inverter driven by a ground voltage and the stored voltage and a second inverter driven by the ground voltage and a generated voltage of the electric power generating means, the level converter converting a level of the generated voltage to a level of the stored voltage based on a result of a comparison made by the comparator, and outputting a resultant signal to the switch,
   wherein the level converter further comprises:
   a first output terminal that outputs one of the ground voltage and the stored voltage based on the result of the comparison; and
   a second output terminal that outputs one of the ground voltage and the generated voltage based on the result of the comparison.

2. The semiconductor device according to claim 1, wherein the reference voltage is the generated voltage of the electric power generating means.

3. The semiconductor device according to claim 1, wherein the reference voltage is a constant voltage output from a constant voltage circuit.

4. The semiconductor device according to claim 3,
   wherein the constant voltage output from the constant voltage circuit is, a voltage at the same level as the generated voltage when the generated voltage is smaller than an overcharge preventing voltage, and
   a voltage at the same level as the overcharge preventing voltage when the generated voltage is equal to or larger than the overcharge preventing voltage.

5. The semiconductor device according to claim 3,
   wherein the switch comprises:
   a first MOS transistor having a back gate terminal and one diffusion terminal which are connected to the electric power storing means side; and
   a second MOS transistor having a back gate terminal and one diffusion terminal which are connected to the electric power generating means side and another diffusion terminal which is connected to another diffusion terminal of the first MOS transistor,
   wherein the first output terminal is connected to a gate terminal of the first MOS transistor, and
   wherein the second output terminal is connected to a gate terminal of the second MOS transistor.

6. The semiconductor device according to claim 4, wherein the switch comprises:
   a first MOS transistor having a back gate terminal and one diffusion terminal which are connected to the electric power storing means side; and
   a second MOS transistor having a back gate terminal and one diffusion terminal which are connected to the electric power generating means side and another diffusion terminal which is connected to another diffusion terminal of the first MOS transistor,
   wherein the first output terminal is connected to a gate terminal of the first MOS transistor, and
   wherein the second output terminal is connected to a gate terminal of the second MOS transistor.

* * * * *